United States Patent
Piet et al.

(10) Patent No.: US 8,256,702 B2
(45) Date of Patent: Sep. 4, 2012

(54) AIRCRAFT LANDING GEAR PROVIDED WITH AT LEAST ONE NOISE REDUCING MEANS

(75) Inventors: Jean-François Piet, Pibrac (FR); Nicolas Molin, Nailloux (FR); Constantin Sandu, Bucharest (RO)

(73) Assignee: Airbus Operations SAS, Toulouse (FR)

( * ) Notice: Subject to any disclaimer, the term of this patent is extended or adjusted under 35 U.S.C. 154(b) by 396 days.

(21) Appl. No.: 12/532,387

(22) PCT Filed: Mar. 18, 2008

(86) PCT No.: PCT/FR2008/000354
§ 371 (c)(1),
(2), (4) Date: Sep. 21, 2009

(87) PCT Pub. No.: WO2008/135647
PCT Pub. Date: Nov. 13, 2008

(65) Prior Publication Data
US 2010/0108805 A1    May 6, 2010

(30) Foreign Application Priority Data
Mar. 23, 2007 (FR) .................................. 07 02128

(51) Int. Cl.
*B64C 1/40* (2006.01)
*B64C 25/16* (2006.01)
*B64C 23/00* (2006.01)
(52) U.S. Cl. ............... 244/1 N; 244/100 R; 244/102 R
(58) Field of Classification Search .............. 244/100 R, 244/102 R, 103 R, 130; 280/155, 156, 847; 296/180.1; 180/903
See application file for complete search history.

(56) References Cited

U.S. PATENT DOCUMENTS

| | | | | |
|---|---|---|---|---|
| 1,341,202 A * | 5/1920 | Strand | ...................... | 244/103 R |
| 2,685,470 A * | 8/1954 | Werner | ...................... | 296/180.1 |
| 2,782,053 A * | 2/1957 | Long | ........................... | 280/851 |
| 7,484,688 B2 * | 2/2009 | Chow et al. | ............... | 244/100 R |
| 7,669,798 B2 * | 3/2010 | Guering et al. | ............... | 244/121 |
| 2006/0102775 A1 * | 5/2006 | Chow et al. | ................... | 244/1 N |

FOREIGN PATENT DOCUMENTS

| | | |
|---|---|---|
| EP | 1 382 526 | 1/2004 |
| WO | 2004/039671 | 5/2004 |
| WO | 2004/089742 | 10/2004 |

OTHER PUBLICATIONS

International Search Report dated Oct. 7, 2008 w/ English translation.
Written Opinion of the International Searching Authority with English translation.

* cited by examiner

*Primary Examiner* — Joseph W Sanderson
(74) *Attorney, Agent, or Firm* — Dickinson Wright PLLC

(57) ABSTRACT

Disclosed is an landing gear that includes at least One constituent element having an upstream air side and downstream air side relative to airflow across the aircraft landing gear in the down position. The landing gear also includes at least one noise reducing unit including at least one individual net having geometric meshes. The net is positioned at the downstream air side of the constituent element and is arranged at the downstream air side so as to reduce noise generating turbulence generated by airflow across the constituent element in its down position.

11 Claims, 3 Drawing Sheets

AIRCRAFT LANDING GEAR PROVIDED WITH AT LEAST ONE NOISE REDUCING MEANS

FIELD OF THE INVENTION

The present invention relates to aircraft landing gear equipped with at least one noise reducing means.

BACKGROUND OF THE INVENTION

More specifically, said landing gear, which can be brought in the usual way into one of two positions, namely an up position and a down position, is of the type comprising at least one noise reducing means which is associated with at least one constituent element (tube, strut, attachment, pipe, etc) of said landing gear.

The present invention applies to all types of landing gear and, in particular, applies equally to nose gear and to main landing gear, whether this be under the wing and/or under the fuselage.

It is known that aerodynamic noise is a critical parameter in aeronautics and that each new aircraft has, in particular in order to gain certification, to comply with international regulations laid down by the ICAO (which is an English-language acronym for "International Civil Aviation Organization"), which is very strict on noise. In addition, the International Civil Aviation Organization will probably in years to come lower the permissible noise limits. What is more, certain airports have laid down noise-related restrictions that are even tighter than these international rules.

It is known that aircraft landing gear is a significant source of noise during takeoff and also, especially, during landing phases (the approach, intermediate and final phases). It is generally accepted that aircraft landing gear produces approximately 30% of the total noise generated by an aircraft during the landing procedure. In addition, measurements have demonstrated that the noise caused by landing gear is emitted over a broad range of frequencies ranging from low frequencies of the order of 90 Hz to frequencies in excess of 4 kHz. The noise emitted by landing gear is therefore not a low-frequency phenomenon and is very annoying particularly to populations living near airports.

This noise is created essentially by the airflow through the constituent elements of the landing gear when the landing gear is down, which causes turbulence phenomena which, by interacting with the structures, causes noise. This is in part due to the fact that not all the various constituent elements (tubes, struts, attachments, wheels, etc) of the landing gear are aerodynamic. In the context of the present invention it will be considered that an element that is aerodynamic is an element that has a shape that causes little disturbance to the airflow and therefore generates little air turbulence that is a source of noise. The stream of air that flows around these non-aerodynamic constituent elements therefore causes turbulence and generates noise. The noise is generally caused when these elements shed the turbulence. In addition, a broadband noise may also be generated, when free turbulence interacts with the surfaces of other elements located downstream. The overall noise produced by landing gear therefore arises chiefly out of turbulence, and its interaction with the elements of the gear, be it aerodynamic or otherwise.

One way of reducing this noise might be to surround some of the constituent elements of the landing gear, or even the entire landing gear, with rigid fairings that have an aerodynamic shape and allow the airflow to be kept away from the non-aerodynamic elements. However, a solution such as this leads to numerous disadvantages such as, in particular, an increase in the cost of manufacture, difficulties in inspecting the landing gear or some of its constituent elements, and an increase in weight.

Document WO-2004/039671 discloses noise reducing means which are arranged on landing gear. These noise reducing means comprise, in particular, a deflecting fairing the purpose of which is to alter the direction of the airflow so as to keep it away from noisy constituent elements of the landing gear with which this fairing is associated. Keeping the air away from a noise-generating zone allows the overall noise to be reduced. This fairing may be equipped with a perforated zone the purpose of which is to limit the amount of air diverted and the potential negative effects thereof. In addition, the (undiverted) air which passes through this perforated zone is slowed so that the resulting noise is also lowered. This earlier document makes provision for under half the surface area of this perforated zone to actually be perforated.

SUMMARY OF THE INVENTION

It in an object of the present invention to overcome the aforementioned disadvantages. The present invention relates to aircraft landing gear comprising at least one noise reducing means that is particularly advantageous (reliable, inexpensive, not very bulky, lightweight, easy to fit, etc.).

To this end, according to the invention, said aircraft landing gear which can be brought into one of two positions, namely an up position and a down position, and which comprises at least one noise reducing means which is associated with at least one constituent element of said landing gear, is noteworthy in that said noise reducing means comprises at least one individual net which comprises geometric meshes and which is positioned at said constituent element such that at least one of the parts thereof is substantially orthogonal to the airflow in an end position (downstream or upstream) of said constituent element when the landing gear is in its down position, so as to reduce the noise (generated by the effects of the airflow at said constituent element).

For preference, said net is positioned at said constituent element such that at least one of the parts thereof is substantially orthogonal to the airflow downstream of said constituent element when the landing gear is in its down position, so as to at least reduce the noise-generating turbulence that is created downstream of said constituent element by a disruption of the airflow caused by this constituent element.

Thus, by virtue of the invention, said noise reducing means, which comprises an individual net, as specified hereinbelow, have numerous advantages and, in particular:
  it allows the noise to be reduced effectively as specified hereinbelow;
  it is lightweight;
  it is not very bulky;
  it is easy to fit; and
  it does not adversely affect the operation of the various constituent elements of the landing gear.

In a first embodiment, said net is in sheet form, which may in particular be flat, curved or V-shaped, and it is positioned in an end position (preferably downstream) relative to a single constituent element.

This first embodiment is particularly well suited to reducing the noise generated by individual constituent elements.

For preference, said net, which may be rigid or elastic, has a width that ranges between 1.5 and 3 times the transverse dimension of the constituent element, and a length substantially equal to the length of this constituent element.

In this first embodiment, when the net is positioned downstream of the constituent element, the noise-generating turbulence shed by the constituent element loses most of its energy as it passes through the meshes of said net which is positioned downstream. Thus, this turbulence is practically eliminated and therefore causes almost no noise. This net also allows the flow to be deflected upstream of the constituent element.

Further, in this first embodiment, when the net is positioned upstream of the constituent element, the flow arriving on the constituent element is slowed, and therefore the noise generated is less. In addition, the shape seen by the flow is more aerodynamic and the noise generated is therefore lower.

Furthermore, in a second embodiment, said net surrounds (preferably completely) at least one constituent element. In this case, for preference, said net however surrounds an entire group of constituent elements (tubes, struts, attachments, wheels, etc.).

This second embodiment is therefore particularly well suited to reducing the noise caused by a group of constituent elements of the landing gear. In this case, said net, which may in particular have a prismatic, cylindrical or elliptical shape, is preferably made of a metallic material (aluminum steel), thus allowing the net to withstand the flow and retain its initial shape. It may also be made of an elastic material (polyester fibers).

In this second embodiment, the net, which surrounds a group of constituent elements, is able to reduce turbulence produced by elements situated upstream or by some of the elements surrounded by this net. In addition, said net has a more aerodynamic shape than the group of constituent elements per se so that the airflow reaching the net causes less noise. Further, in the internal volume formed by this net, the speed of the air reaching the constituent element is greatly reduced because of viscous friction as the air passes through the geometric meshes, this too contributing to reducing noise.

Furthermore, in one particular embodiment:
said geometric (polygonal or round) meshes of the net have dimensions (for example diameter in the case of round meshes, side length in the case of square meshes, etc.) ranging between 0.2 and 12.5 mm and preferably between 1.5 and 2 mm; and/or
said landing gear comprises a plurality of noise reducing means according to the invention, as described hereinabove.

BRIEF DESCRIPTION OF THE DRAWINGS

The figures of the attached drawing will make it easy to understand how the invention may be embodied. In these figures, identical references denote elements that are similar.

DETAILED DESCRIPTION OF THE INVENTION

Figure 8:
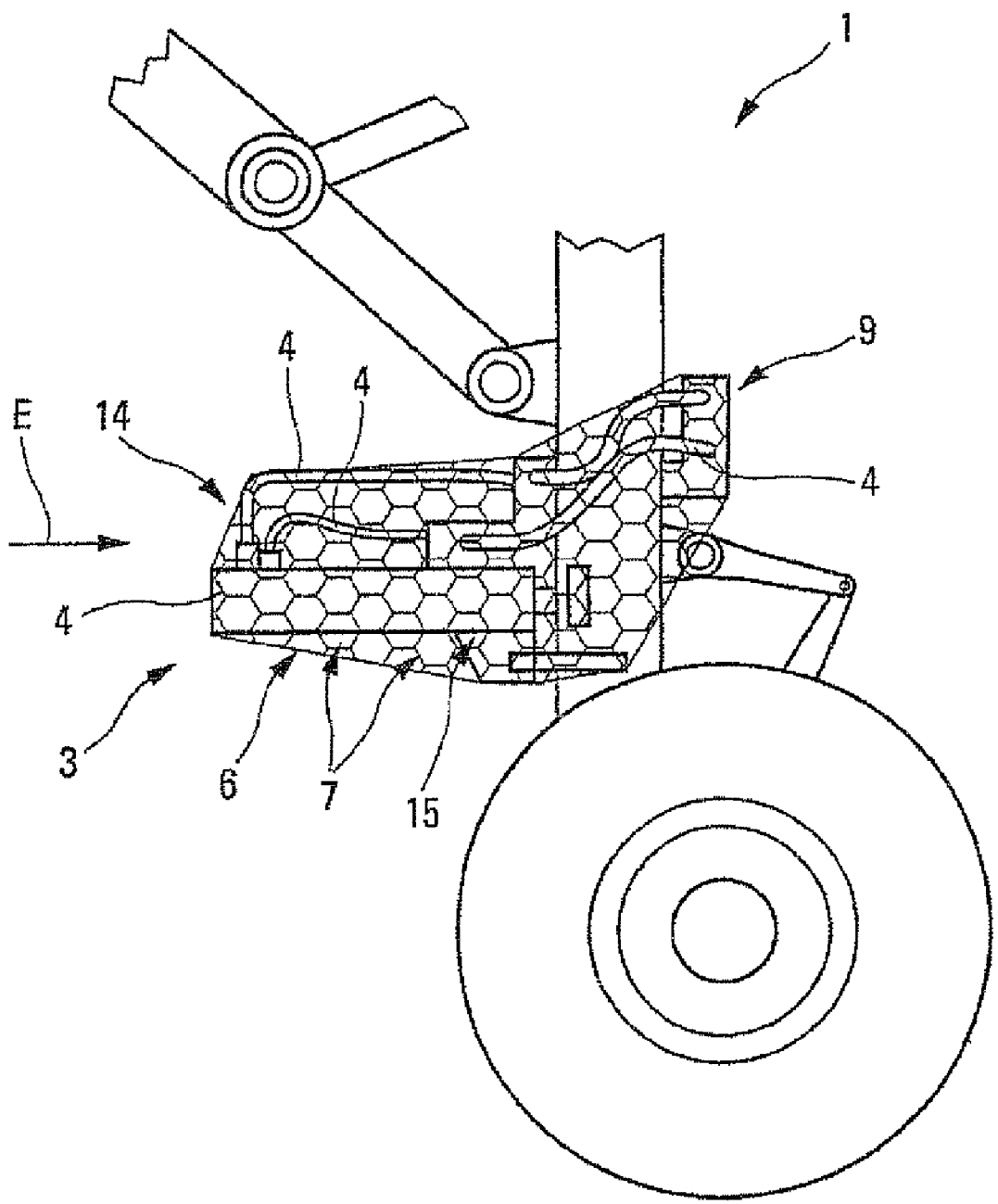
FIG. 8 partially shows aircraft landing gear equipped with a noise reducing means according to a second embodiment of the invention.

The present invention relates to aircraft landing gear 1, for example nose gear or main landing gear, as depicted by way of example in FIG. 8.

This landing gear 1, which can be brought in the usual way into one of two positions, namely an up position (not depicted) in flight and a down position (FIG. 8) for landing, takeoff, or running along the ground, comprises at least one noise reducing means 2, 3 which is associated with at least one constituent element 4 (tube, strut, attachment, pipe, etc.) of the landing gear 1. Said noise reducing means 2, 3 is depicted according to a first embodiment 2 in FIGS. 1 to 7 and according to a second embodiment 3 in FIG. 8.

According to the invention, said noise reducing means 2, 3 comprises at least one individual net 5, 6 which comprises geometric meshes 7 and which is positioned at at least one constituent element 4 (which is not aerodynamic) of the landing gear 1. This individual net 5, 6 is positioned such that at least one of the parts 8, 9 thereof is substantially orthogonal to the airflow, illustrated by arrows E in FIG. 1, in an end position (upstream or downstream) of said constituent element 4 when the landing gear 1 is in its down position. An individual net 5, 6 such as this makes it possible to reduce the noise caused by the effects of the airflow at said constituent element 4 in the way specified hereinbelow.

Figure 1:
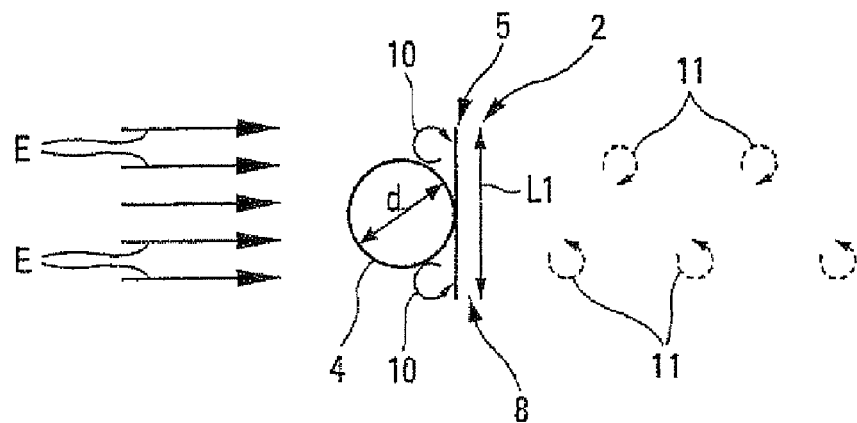
FIGS. 1 to 4 schematically show various alternative forms relating to a first embodiment of a noise reducing means according to the invention.
Figure 2:
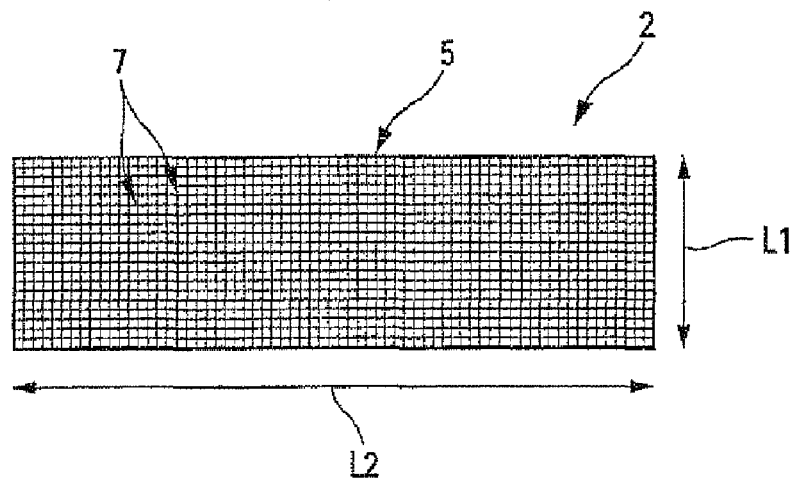

For preference, said net 5 is positioned at said constituent element 4 such that at least one of the parts 8 thereof is substantially orthogonal to the airflow E, downstream of said constituent element 4, when the landing gear is in its down position as depicted in FIG. 1. This makes it possible to reduce the noise generating turbulence (illustrated by curved arrows 10) created downstream of said constituent element 4 by a disruption to the airflow caused by this constituent element 4. This reduction in turbulence is illustrated by curved arrows 11 drawn in broken line as a replacement for the curved arrows 10 drawn in solid line (that illustrate turbulence). In addition, the downstream element is able to divert some of the airflow away from the constituent element 4.

Thus, by virtue of the invention, said noise reducing means 2, 3 which comprises an individual net 5, 6 has numerous advantages and, in particular:
it makes it possible effectively to reduce the noise, as specified hereinbelow;
it is, by its very nature, lightweight;
it is not very bulky;
it is easy to fit;
it does not adversely affect the operation of the various constituent elements of landing gear 1; and
it can be applied to any kind of landing gear 1.

In a first embodiment depicted in FIGS. 1 to 7, said noise reducing means 2 comprises a net 5 which is in the form of a sheet and is preferably positioned downstream of a single non-aerodynamic constituent element 4 which is depicted by way of example in the form of a cylinder in FIGS. 1, 3, 4 and 7. This first embodiment is particularly well suited to reducing the noise caused by a single individual constituent element 4.

Figure 3:
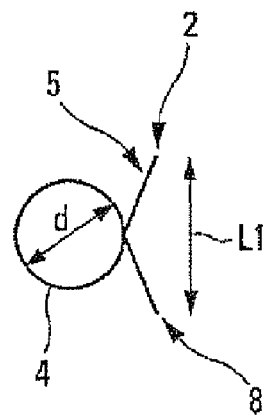
Figure 4:
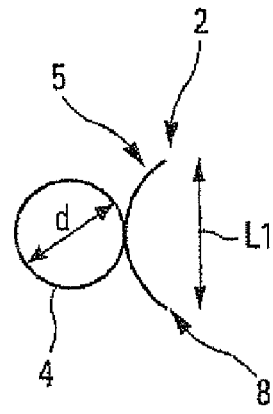

According to the alternative forms of embodiment, the net 5 may, in particular, have:
a flat form, as depicted in FIGS. 1, 2, 5, 6 and 7;
a V shape, as depicted in FIG. 3; and
a curved shape, as depicted in FIG. 4.

The net 5 is preferably made either of a rigid (for example metallic) material or of an elastic material. The geometric meshes 7 may be produced in a single piece from an elastic material or from fine filaments or wires (preferably metallic). In addition, said geometric meshes 7 have dimensions (for example diameters in the case of round meshes, side lengths in the case of square meshes, etc.) ranging between 0.2 and 12.5 mm and preferably between 1.5 and 2 mm. The diameters of the wires or filaments preferably range between 0.1 and 1.2 mm.

Said individual net 5 has a width L1 transverse to the airflow E (and to the longitudinal axis of the constituent element 4) which preferably ranges between 1.5 and 3 times the transverse dimensions of the constituent element 4, namely the diameter d in the example of FIGS. 1, 3 and 4. In addition, the length L2 of said net 5 is preferably substantially equal to the length of the constituent element 4, as depicted for example in FIG. 7.

Figure 7:
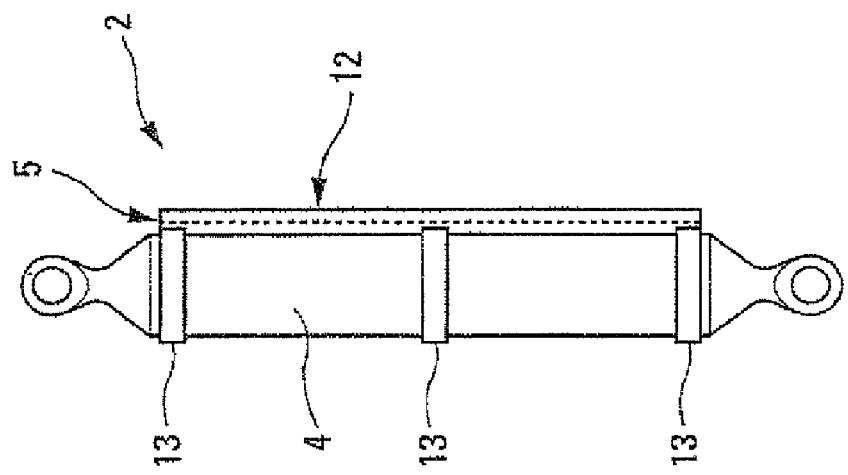
FIGS. 5 to 7 depict one exemplary embodiment of a noise reducing means corresponding to the alternative form of FIG. 1.
Figure 6:
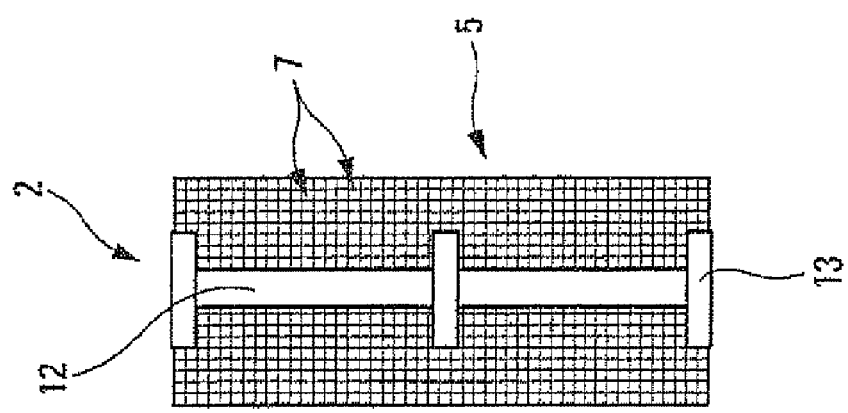
Figure 5:
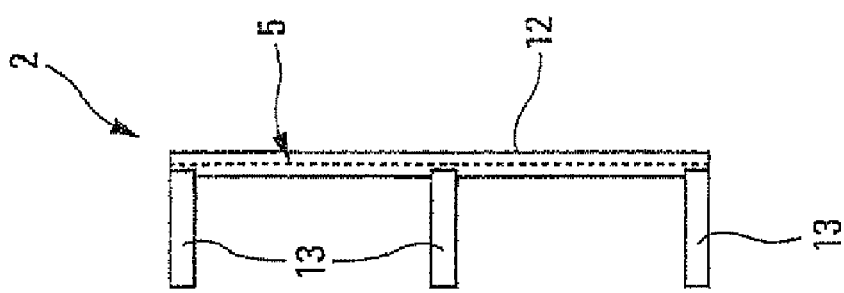

In the particular embodiment of FIGS. 5 to 7, the noise reducing means 2 comprises, in addition to the net 5, a strip 12 which is attached, for example by bonding, to the net 5 and which is secured to fasteners 13, for example collars. These collars 13 are of a diameter suited to the diameter of the cylinder that forms the constituent element 4 and are attached to this cylinder in the usual way as depicted in FIG. 7 so as to hold the net 5 in the appropriate position with respect to said constituent element 4.

In this first embodiment, when the net 5 is positioned downstream of the constituent element 4, the noise-generating turbulence shed by the constituent element 4 loses most of its energy as it passes through the meshes 7 of said net 5 positioned downstream, as illustrated in FIG. 1. Thus, this turbulence is practically eliminated and therefore generates almost no noise.

Furthermore, in the second embodiment depicted in FIG. 8, the net 6 surrounds an entire group 14 of constituent elements 4 (tubes, struts, attachments, pipes, etc.).

This net 6 may in particular have a prismatic, cylindrical or elliptical shape and is preferably made of a metallic material (aluminum steel) thus allowing the net to withstand the flow and retain its initial shape. It may equally be made of an elastic material (polyester fibers). For preference, the geometric meshes 7 of said net 6 have dimensions (for example diameters in the case of round meshes, side lengths in the case of square meshes, etc.) ranging between 0.2 and 12.5 mm and preferably between 1.5 and 2 mm. The diameters of the filaments or wires preferably range between 0.1 and 1.2 mm.

In this second embodiment, the net 6 which surrounds a group 14 of constituent elements 4 is able to reduce the turbulence produced by elements situated upstream (in the direction of airflow E) or by some of the elements 4 surrounded by this net 6. In addition, said net 6 has a more aerodynamic shape than the group 14 of constituent elements 4 per se so that the airflow reaching said net 6 causes less noise (than the airflow that would reach the group 14 were the net 6 absent).

Furthermore, in the internal volume 15 formed by this net 6, the speed of the air is greatly reduced because of viscous friction as the air passes through the geometric meshes 7. The noise (which is proportional to the speed to the power of 5) is therefore lower.

The landing gear 1 according to the invention may, in one particular embodiment, comprise a plurality of such noise reducing means 2, 3.

The invention claimed is:

1. An aircraft landing gear configured to be brought into an up position and a down position, comprising:
   at least one constituent element having an upstream air side and an downstream air side relative to airflow across the aircraft landing gear in the down position; and
   at least one noise reducing means comprised of at least one individual net having geometric meshes, wherein the at least one individual net (i) surrounds the at least one constituent element and (ii) includes a portion disposed at the downstream air side of the at least one constituent element, that is configured so as to reduce noise generating turbulence at the downstream side of the at least one constituent element generated by the airflow across said at least one constituent element in the down position.

2. The landing gear as claimed in claim 1, wherein said at least one individual net is positioned at said at least one constituent element such that at least one part of the at least one constituent element is substantially orthogonal to the airflow downstream of said at least one constituent element when the landing gear is in the down position.

3. The landing gear as claimed in claim 1, wherein the at least one constituent element comprises a single constituent element and said at least one individual net is in sheet form, and is positioned in an end position relative to the single constituent element.

4. The landing gear as claimed in claim 3, wherein said at least one individual net has a width that ranges between 1.5 and 3 times a transverse dimension of the at least one constituent element.

5. The landing gear as claimed in claim 1, wherein the at least one constituent element comprises a group of constituent elements, and wherein said at least one individual net surrounds the group of constituent elements and said portion of the at least one individual net is configured so as to reduce noise generating turbulence at the downstream side of the group of constituent elements generated by the airflow across said group of constituent elements in the down position.

6. The landing gear as claimed in claim 1, wherein said at least one individual net is made of a metallic material.

7. The landing gear as claimed in claim 1, wherein said geometric meshes of the at least one individual net have dimensions ranging between 0.2 and 12. 5 mm.

8. The landing gear as claimed in claim 1, wherein the at least one noise reducing means comprises a plurality of noise reducing means.

9. An aircraft, comprising the landing gear of claim 1.

10. The landing gear and as claimed in claim 1, wherein said at least one individual net has a width that ranges between 1.5 and 3 times a transverse dimension of the constituent element.

11. An aircraft landing gear configured to be brought into an up position and a down position, comprising:
   at least one constituent element having an upstream air side and an downstream air side relative to airflow across the aircraft landing gear in the down position; and
   at least one noise reducing means comprised of at least one individual net having geometric meshes, wherein the at least one individual net (i) surrounds the at least one constituent element and (ii) includes a portion disposed at the downstream air side of the at least one constituent element, that is configured so as to reduce noise generating turbulence at the downstream side of the at least one constituent element generated by the airflow across said at least one constituent element in the down position.

* * * * *